T. H. KELLY.
TRACTION DEVICE FOR VEHICLE WHEELS.
APPLICATION FILED APR. 4, 1913.
1,102,274.
Patented July 7, 1914.
2 SHEETS—SHEET 1.
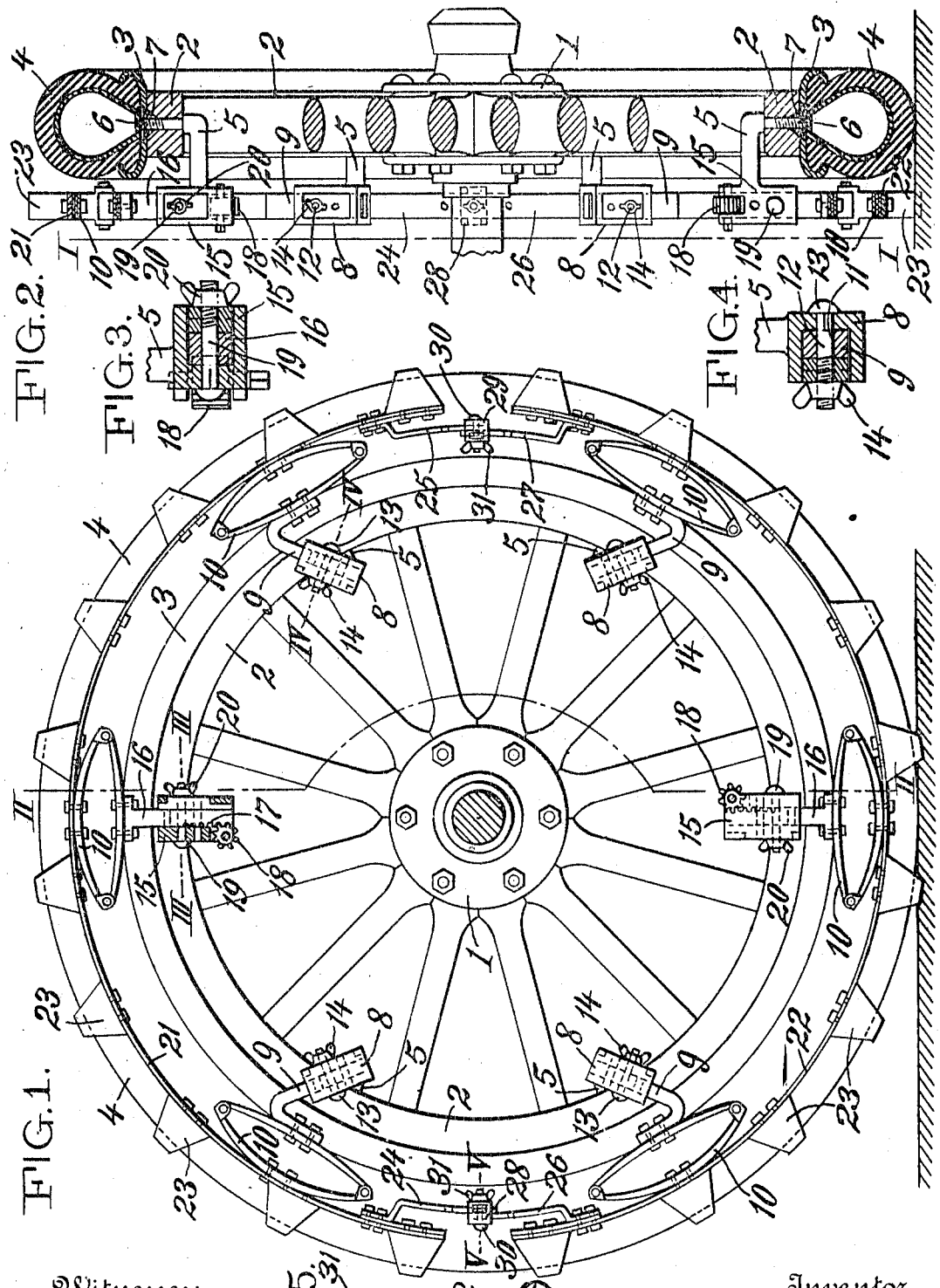

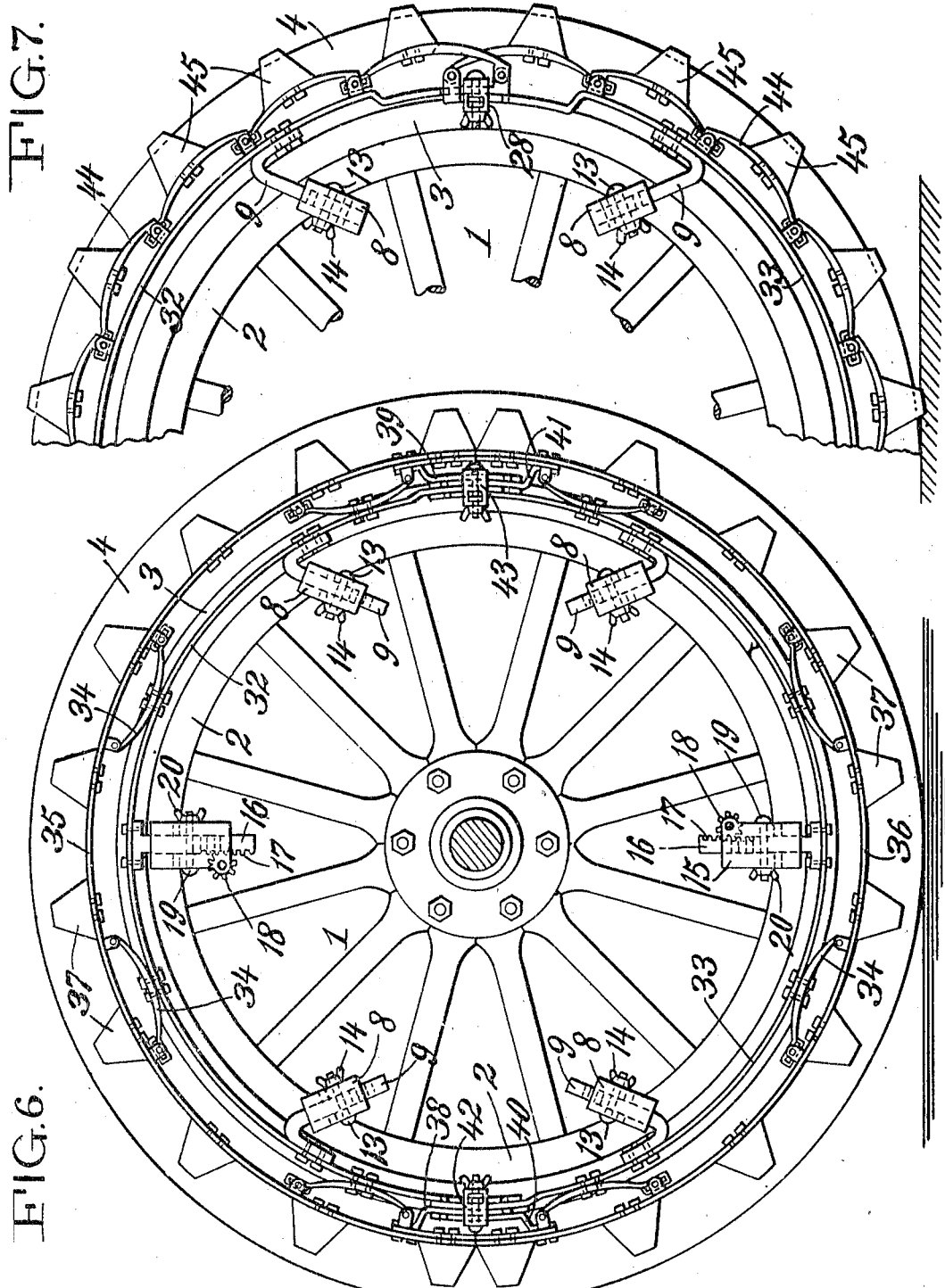

UNITED STATES PATENT OFFICE.

THOMAS H. KELLY, OF NEW YORK, N. Y.

TRACTION DEVICE FOR VEHICLE-WHEELS.

1,102,274.     Specification of Letters Patent.      Patented July 7, 1914.

Application filed April 4, 1913. Serial No. 758,753.

*To all whom it may concern:*

Be it known that I, THOMAS H. KELLY, a citizen of the United States, residing in the borough of Manhattan, city, county, and State of New York, have invented certain new and useful Improvements in Traction Devices for Vehicle-Wheels, of which the following is a specification.

My invention relates to improvements in traction devices for vehicle wheels, particularly those having rubber tires, and aims to provide a structure detachably mountable upon a vehicle wheel and adjustable with respect to the ground, so that it may be brought into operative position when needed and withdrawn when road conditions make its use unnecessary.

In the accompanying drawings which form a part of this specification, Figure 1 is a front elevation of a vehicle wheel provided with a rubber tire and equipped with my traction device; Fig. 2 is a transverse sectional view on line II—II of Fig. 1; Fig. 3 is an enlarged fragmentary sectional view on line III—III of Fig. 1; Fig. 4 is an enlarged fragmentary sectional view on line IV—IV of Fig. 1; Fig. 5 is an enlarged fragmentary sectional view on line V—V of Fig. 1; Fig. 6 is a front elevation of a vehicle wheel provided with a tire and equipped with a modified form of my device, the parts being shown retracted out of operative position; Fig. 7 is a fragmentary front elevation of a vehicle wheel provided with a further modification of the traction device.

Referring to the drawings in detail and particularly to Figs. 1 to 5, inclusive, the numeral 1 designates a vehicle wheel provided with a felly 2 upon which is mounted a tire-carrying rim 3 supporting the pneumatic tire 4. although my device is adapted for use with any type of tire. A plurality of brackets 5 are attached to the wheel by having their threaded ends 6 pass radially through the felly and engage conical nuts 7 mounted in sockets formed in the felly and the base of the tire-carrying rim. Four of these brackets have formed upon their outer extremities box members 8 whose major axes are substantially parallel to the major plane of the wheel, but inclined to a radius for a purpose which will later be described. Each of these boxes receives one arm of an angle bracket 9 upon which is mounted a full elliptic spring 10.

The flattened end of each bracket 9 which is received within the box member 8 is provided with a plurality of holes 11 therethrough adapted to receive a bolt 12 provided with the head 13 and wing nut 14, so that the bracket 9 may be clamped in any one of a number of positions with respect to its particular box member.

Two of the bracket members 5, which are diametrically opposite each other, carry upon their outer extremities box members 15 adapted to receive T-brackets 16, each of which carries a full elliptic spring 10. The shafts of the brackets 16 are provided with teeth 17 engaging the pinions 18. Passing transversely through each of the brackets 16 are a plurality of holes for the reception of a bolt 19 passing through the box member 15 and provided with a wing nut 20 for clamping the bracket in fixed position with respect to the member 15. Two segmental, approximately semi-circular resilient straps or bands 21 and 22 are mounted upon the elliptic springs, as clearly shown in Fig. 1. These bands are provided about their outer periphery with wedge-shaped blocks 23 of wood, fiber or metal for engagement with the road surface, thereby increasing the tractive effort expended by the wheel in passing over a slippery surface. The strap or band 21 is provided with two offset straps or extensions 24 and 25 and the band 22 is provided with two similarly offset straps 26 and 27. These respective straps overlap, as shown in Fig. 1. and means for clamping them together are provided by the box members 28 and 29, each of which has a bolt 30, wing nut 31 and filling piece 32 for clamping the overlapping end of the strap members in fixed position. Each of the straps is provided with a plurality of holes transversely therethrough for the reception of its respective bolt.

In operating the device the wing nuts 14, 20 and 31 are first loosened and the bolts 13, 19 and 30 removed. By applying a wrench to the nuts on the ends of the shafts of the gears 18, these gears may be rotated, thus causing the brackets 16 to slide in the respective boxes in which they are received until corresponding holes in the brackets come opposite the bolt holes in the boxes. The bolts 19 are then replaced and the wing nuts 20 tightened into place. The brackets 9 are then similarly secured in their respective boxes in the proper position to maintain the circular configuration of the members 21 and 22. It will be observed that the boxes 8 are inclined to a radius of the wheel in order to permit this circularity being maintained, a condition which would be impossible if these boxes, as well as the boxes 15, were radial. The bolts 30 and nuts 31, which have previously been removed, are now clamped in position and the wheel is ready for service.

It will be seen that the structure may be given the position shown in Fig. 1, in which the blocks 23 extend beyond the periphery of the tire and are adapted to engage the ground and thereby increase the tractive effect, or that by the retraction of the brackets toward the center of the wheel, the device may be withdrawn into such a position that the blocks will be entirely free from the ground and will be inoperative. Therefore, by a simple adjustment the motorist or other vehicle user may prepare for any character of road bed without going through the cumbersome procedure of attaching chains, grips or the like to the tire, and without liability of damage to the tread of the tire which these traction devices often cause.

In Fig. 6 I have shown a modification in which two resilient bands 32 and 33 are carried by the bracket members, and these in turn carry a plurality of semi-elliptic springs 34 which support the resilient semi-circular members 35 and 36, upon which are mounted the traction blocks 37. The members 35 and 36 have riveted or otherwise secured to their ends the straps 38, 39, 40 and 41. These overlapping straps and the overlapping ends of the semi-circular members 32 and 33 are secured in place by means of box members 42 and 43 similar in construction and mode of operation to the members 28 and 29 previously described.

Fig. 7 shows a further modification in which the rings 32 and 33 carried by the brackets support a plurality of semi-elliptic springs 44 pivoted at one end and formed with a sliding bearing at the other in the customary manner, each of these springs carrying a traction block 45.

While I have illustrated and described only certain specific embodiments of my invention, it will be apparent that it is susceptible of wide application and I do not desire to be limited to the precise structures shown and described.

Having thus described my invention, I claim:

1. In a traction device for vehicle wheels, road-engaging means, a plurality of segmental straps carrying said road-engaging means, and means for mounting said straps upon a vehicle wheel and for adjusting the same radially with respect to said wheel at two diametrically opposite points and in a direction inclined to a radius at an intermediate point.

2. In a traction device for vehicle wheels, road-engaging means, a plurality of overlapping, substantially semi-circular segmental straps carrying said road-engaging means, and means for resiliently mounting said straps upon a vehicle wheel and for adjusting the same with respect to said wheel to change the area inclosed thereby without loss of circularity.

3. In a traction device for vehicle wheels, road-engaging means, a plurality of segmental straps carrying said road-engaging means, and means for resiliently mounting said straps upon a vehicle wheel substantially concentric with the periphery of the tire thereof but laterally offset therefrom, and for adjusting the same radially with respect to said wheel at two diametrically opposite points and in a direction inclined to a radius at an intermediate point.

4. In a traction device for vehicle wheels, a plurality of segmental straps, means for mounting said straps upon a vehicle wheel including brackets secured to the wheel having portions laterally offset therefrom, road-engaging members secured to said straps, and means for adjusting said members upon said brackets in a plurality of directions, some of which are inclined to a radius to cause the straps to inclose a varying area without loss of circularity.

5. In a traction device for vehicle wheels, a pair of semi-circular segmental straps, road-engaging means carried thereby, and a plurality of means for connecting each of said straps to a wheel, one of said means being located centrally with respect to said strap and being capable of adjustment radially with respect to the wheel, and another of said means being located adjacent to the end of said strap and being capable of adjustment in a direction inclined to a radius.

THOMAS H. KELLY.

Witnesses:
SEWARD DAVIS,
OLIVER WILLIAMS.